United States Patent
Meli et al.

(10) Patent No.: US 7,054,059 B1
(45) Date of Patent: May 30, 2006

(54) LUMPED RAMAN AMPLIFICATION STRUCTURE FOR VERY WIDEBAND APPLICATIONS

(75) Inventors: Fausto Meli, Piacenza (IT); Rosanna Pastorelli, Melegnano (IT); Roberta Castagnetti, Monza (IT)

(73) Assignee: Cisco Technoloy, Inc., San Jose, CA (US)

( * ) Notice: Subject to any disclaimer, the term of this patent is extended or adjusted under 35 U.S.C. 154(b) by 329 days.

(21) Appl. No.: 10/437,496

(22) Filed: May 14, 2003

(51) Int. Cl.
H04B 10/12 (2006.01)

(52) U.S. Cl. .................................. 359/334

(58) Field of Classification Search ............... 359/334
See application file for complete search history.

(56) References Cited

U.S. PATENT DOCUMENTS

| | | | |
|---|---|---|---|
| 5,701,194 A | 12/1997 | Meli et al. ............... 359/341 |
| 5,748,364 A | 5/1998 | Meli et al. ............... 359/341 |
| 5,808,787 A | 9/1998 | Meli et al. ............... 359/341 |
| 5,852,510 A | 12/1998 | Meli et al. ............... 359/341 |
| 5,905,838 A | 5/1999 | Judy et al. ............... 385/123 |
| 6,025,954 A | 2/2000 | Meli et al. ............... 359/341 |
| 6,181,464 B1 | 1/2001 | Kidorf et al. ............. 359/134 |
| 6,191,877 B1 | 2/2001 | Chraplyvy et al. ......... 359/124 |
| 6,239,902 B1 | 5/2001 | Islam et al. .............. 359/124 |
| 6,259,555 B1 | 7/2001 | Meli et al. ............... 359/337 |
| 6,310,716 B1 | 10/2001 | Evans et al. ............. 359/334 |
| 6,344,922 B1 | 2/2002 | Grubb et al. ............. 359/134 |
| 6,356,383 B1 | 3/2002 | Cornwell et al. .......... 359/334 |
| 6,359,728 B1 | 3/2002 | Angellieri et al. ........ 359/341 |
| 6,384,963 B1 | 5/2002 | Ackerman et al. ......... 359/334 |
| 6,417,958 B1 | 7/2002 | Du et al. ................. 359/334 |
| 6,424,455 B1 | 7/2002 | Dmitri ................... 359/334 |
| 6,433,921 B1 | 8/2002 | Wu et al. ................ 359/334 |
| 6,441,950 B1 | 8/2002 | Chen et al. .............. 359/334 |
| 6,519,079 B1 | 2/2003 | Grochocinski et al. ..... 359/337 |
| 6,532,101 B1 * | 3/2003 | Islam et al. ............. 359/334 |
| 6,646,786 B1 | 11/2003 | Meli et al. .............. 259/334 |
| 6,646,788 B1 * | 11/2003 | Islam et al. ............. 359/334 |
| 6,657,777 B1 | 12/2003 | Meli et al. .............. 359/334 |
| 6,862,135 B1 * | 3/2005 | Evans et al. ............ 359/337.1 |
| 6,894,829 B1 * | 5/2005 | Jolley et al. ............ 359/337.4 |
| 2002/0021864 A1 | 2/2002 | Emori et al. ............. 385/27 |
| 2003/0002137 A1 * | 1/2003 | Islam et al. ............. 359/334 |

(Continued)

FOREIGN PATENT DOCUMENTS

EP 0734129 9/1996

(Continued)

OTHER PUBLICATIONS

Aoki, Yashuhiro. "Properties of Fiber Raman Amplifiers and Their Applicability to Digital Optical Communication System." J. Lightwave Tech. 6:7, Jul. 1998, pp. 1225-1239.

(Continued)

Primary Examiner—Jack Keith
Assistant Examiner—Eric Bolda
(74) Attorney, Agent, or Firm—Aka Chan LLP

(57) ABSTRACT

Improved lumped Raman amplification systems are disclosed. A lumped Raman amplification structure provides optimized efficiency, low noise figure over a range of gain settings, and a high saturation threshold. Responsibility for amplifying different portions of the spectrum is divided among multiple stages. In one particular implementation, two outer stages amplify a first band and two inner stages amplify a second band. The two inner stages also apply a small amount of amplification to the first band. A modification improves noise figure in the second band by adding some amplification in the second band to the first stage.

9 Claims, 6 Drawing Sheets

U.S. PATENT DOCUMENTS

| | | | |
|---|---|---|---|
| 2003/0025989 A1* | 2/2003 | Grubb et al. | 359/341.3 |
| 2003/0067674 A1* | 4/2003 | Islam et al. | 359/341.41 |
| 2003/0095324 A1* | 5/2003 | Islam et al. | 359/337.1 |
| 2003/0108315 A1 | 6/2003 | Kubo et al. | 385/123 |

FOREIGN PATENT DOCUMENTS

| | | |
|---|---|---|
| EP | 1239558 | 9/2002 |
| JP | 2000214503 | 8/2000 |

OTHER PUBLICATIONS

Eiselt, M. et al. "Optical SNR Versus Q-Factor Improvement With Distributed Raman Amplication in Long Amplifier Chains," 2000 ECOC Proc., vol. 3 pp. 77-78.

Forghieri, F. et al. "Bandwidth of cross talk in Raman amplifiers," 1994 OFC Optical Fiber Communication, Technical Digest, vol. 4 pp. 294-295.

Forghieri, F. I et al. "Fiber Nonlinerities and Their Impact on Transmission Systems," 1997 Optical Fiber Telecommunications IIIA, Chapter 8 pp. 196-264.

Griseri et al., U.S. Appl. No. 60/279,854, "Interaction of Four-Wave Mixing and Distributed Raman Architecture".

Griseri et al., U.S. Appl. No. 09/899,872, "Reduced Four-Wave Mixing Raman Amplification Architecture".

Hansen et al. "Rayleigh Scattering Limitations in Distributed Raman Pre-Amplifiers." Photonics Tech. Lett. 10:1, Jan. 1998, pp. 159-161.

Masuda et al., ECOC'99, Sep. 30, 1999 pp. 146-147.

Mochizuki, K "Amplified Spontaneous Raman Scattering in Fiber Raman Amplifiers," 1986 IEEE vol. LT-4, No. 9 pp. 1328-1333.

Nielsen, T.N. et al. "3.28-Tb/s Transmission Over 3×100 km of Nonzero-Dispersion Fiber Using Dual C- and L-Band Distributed Raman Amplification," 2000 IEEE Photonics Technology Letters, vol. 12, No. 8 pp. 1079-1081.

Nicholson, J.W., "Discrete Raman Amplifiers With Pump Reflectors for Increased Gain and Efficiency" ECOC 2002.

Radic, S et al. "Signal Impairment due to Four-Wave Mixing in L-Band EDFAs," 1999 Proc. ECOC.

Suzuki, H et al. "1-Tb/s (100×10 Gb/s) Super-Dense WDM Transmission with 25-GHz Channel Spacing in the Zero-Dispersion Region Employing Distributed Raman Amplification Technology," 2000 IEEE Photonics Technology Letters, vol. 12, No. 7 pp. 903-905.

Thiele, H.J. et al., "Impact of Discrete Raman Amplifier Architecture on Nonlinear Impairments" ECOC 2002.

Therehara et al., Opt. Fiber Communication Conf., col. 37, pp. 251-253, Mar. 10, 2000.

\* cited by examiner

LUMPED RAMAN AMPLIFICATION STRUCTURE FOR VERY WIDEBAND APPLICATIONS

BACKGROUND OF THE INVENTION

The present invention relates to optical networking and more particularly to systems and methods for optical amplification.

Available optical fiber bandwidth has been only partially utilized in high capacity optical transmission due to lack of applicable optical amplifier technologies to overcome fiber losses in the wavelength range 1300 nm to 1650 nm. Lumped Raman amplifiers allow the designer to adjust the spectral position and spectral width of the amplification region to optimally account for channel capacity, channel spacing, and transmission fiber type. Lumped Raman amplification also provides important advantages in that the same fiber can provide gain and dispersion compensation simultaneously while maintaining low noise figure in comparison to standard EDFA (Erbium-doped fiber amplifier) technology.

A disadvantage of Raman amplification is poor power conversion efficiency in comparison to EDFAs. For example, a typical lumped Raman amplifier that also provides dispersion compensation may have an efficiency of 2–3% as compared to 8–10% for an EDFA module that incorporates a variable optical attenuator that balances saturation and chromatic dispersion compensation loss. This lower efficiency can be justified only for large bandwidth/high capacity applications where at least 2 EDFAs must be used. For example where both the 1530–1560 nm and 1570–1600 nm bands are used, each band generally requires a two-stage EDFA composed of a preamplifier and a booster. The use of multiple EDFAs raises the cost of that approach to an unacceptable level.

When bandwidths are very wide, (e.g., >50 nm) and the number of channels is also large, input amplifier power will be very large giving rise to saturation difficulties with EDFA technology. However, the saturation advantage of lumped Raman amplifier technology in this situation is limited due to interactions among multiple pump signals that are used to establish the very broad amplification bandwidth. In particular, for bandwidths greater than 60 nm, the combination of pump-to-pump interactions and high input power leads to uncontrollable saturation effects unless effective countermeasures are implemented.

Schemes have been developed to employ pump reuse to provide improved saturation performance, power conversion efficiency, and also noise figure. One approach adds a pump reflector to a counter-propagating pump structure. Another approach adds an optical feedback scheme to a counter-propagating pump structure. These approaches add undesired complexity.

The above-mentioned problems are exacerbated in the context of a metropolitan optical network, e.g., a network where spans range from zero to 80 km. There may be rapid changes in optical network configuration over time due to traffic variations leading to addition and deletion of channels from the channel grid. Also, the number of channels may vary greatly from node to node as channels are added and dropped. Low noise figure, sufficient gain, and appropriate levels of saturation have to be maintained over a wide range of channel counts and system span lengths. EDFA technology can maintain the needed gain and chromatic dispersion compensation over the range of input powers inherent in the variability of channel counts and span length only at the expense of excessive noise figure (e.g., typically from 6 to 12 dB for gain from >20 dB to 12 dB.). If an EDFA is used in a low gain regime the noise figure can reach very high values (e.g., at 5 dB gain, the noise figure can increase up to 25 dB).

Improved systems and methods for optical amplification are needed that can provide appropriate gain over a large bandwidth and broad range of channel counts and input power levels.

SUMMARY OF THE INVENTION

Embodiments of the present invention provide improved lumped Raman amplification systems. A lumped Raman amplification structure provides optimized efficiency, low noise figure over a range of gain settings, and a high saturation threshold. Responsibility for amplifying different portions of the spectrum is divided among multiple stages. In one particular implementation, two outer stages amplify a first band and two inner stages amplify a second band. The two inner stages also apply a small amount of amplification to the first band. A modification improves noise figure in the second band by adding some amplification in the second band to the first stage.

A first aspect of the present invention provides a method for amplifying an optical signal. The method includes: providing an input signal having first and second non-overlapping bands of active wavelengths, amplifying the input signal in a first stage having substantially greater gain in the first band than in the second band, and amplifying the input signal in a second stage following the first stage, the second stage having substantially greater gain in the second band than in the first band.

A second aspect of the present invention provides apparatus for amplifying an optical signal. The apparatus includes an input that receives an optical signal having first and second non-overlapping bands of active wavelengths, a first Raman amplification stage that amplifies the optical signal and has substantially greater gain in the first band than in the second band, and a second Raman amplification stage that amplifies the optical signal and has substantially greater gain in the second band than in the first band.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative optical wavelength division multiplexing (DWM) system architecture. In the representative architecture there are 100 channels or wavelengths spaced 100 GHz apart. The channels are found in the wavelength range of 1530 nm to 1610 nm. Each channel carries a 10 Gbps transmission. The optical signal to noise ratio (OSNR), at the receiver, should be greater than 14 dB over 0.5 nm bandwidth.

Single mode fiber (SMF) is used. The link consists of a transmitter site, a receiver site, a series of optical amplification sites, and a series of fiber spans between the sites. Some possible span configurations include seven spans of 14 dB loss (7×14) 5×20, 2×26, 1×31. In each case the amplifier sites provide gain to compensate for the losses of the preceding span. The overall maximum link length before regeneration of the optical signal from recovered data is considered in this example to be approximately 400 Km.

Figure 1:
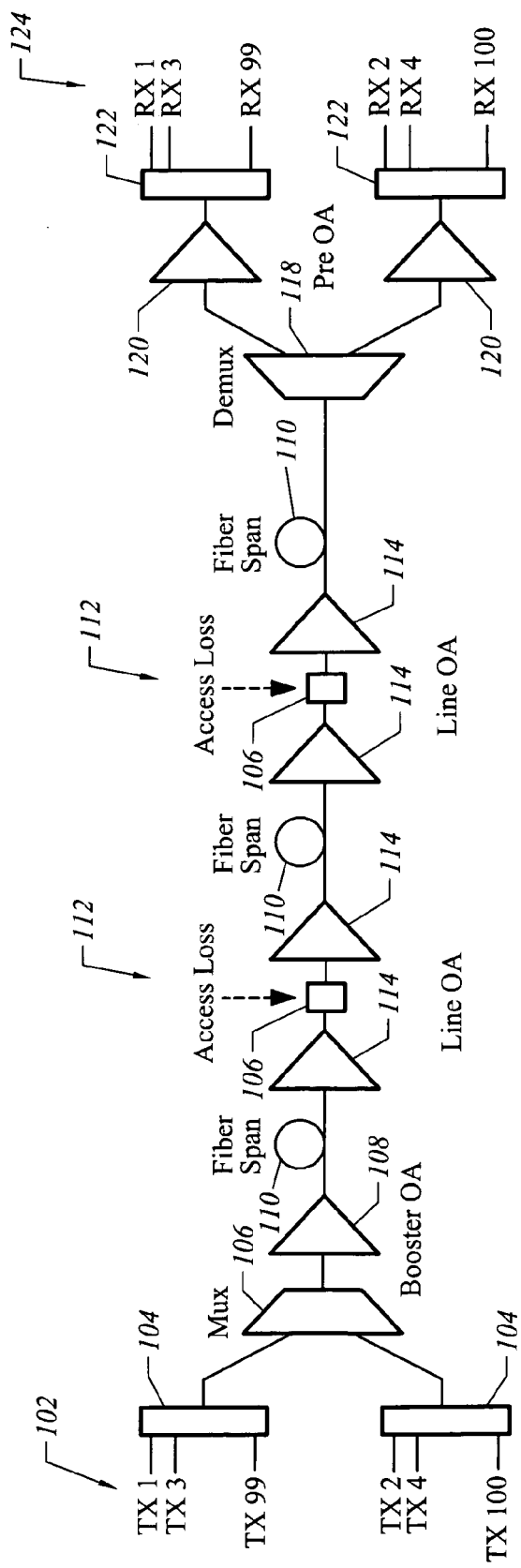
FIG. 1 depicts a general optical WDM system architecture to which embodiments of the present invention may be applied.

FIG. 1 depicts such an architecture. At a transmitter site, there are 100 optical transmitters 102, one for each wavelength. Each modulated optical signal is fed into a first stage multiplexer 104. A final multiplexer 106 combines all the wavelengths into the WDM signal to be transmitted. A booster optical amplifier 108 increases the WDM signal power prior to injection into the link.

The link includes a series of fiber spans 110. Three are depicted although it would be understood that the link may extend for a larger number of spans. Between the spans are found line optical amplifiers 112. Two are shown. Each line optical amplifier 112 includes two lumped Raman amplifier modules 114. In the representative application, each lumped Raman amplifier module 114 has a noise figure of less than 5.5 dB. Also the fiber used to implement the Raman amplifier module is also used to implement chromatic dispersion compensation. Although the amplifier modules will typically have the same gain, the amount of chromatic dispersion compensation may be varied in order to match needs at particular points in the link.

Also, at each amplifier site between the lumped Raman amplifier modules 114 there is an access loss stage 116 that allows for, e.g., 16 dB of loss. For example, an optical add-drop multiplexer (OADM) may be implemented at this point to add and drop particular optical channels for local use. Other signal conditioning devices can be substituted for an OADM.

At the receiver end of the link, there is a demultiplexer 118 followed by parallel optical pre-amplifiers 120 and additional demultiplexing stages 122 which provide the individual wavelengths to receivers 124. There is one receiver 124 for each wavelength.

Figure 2:
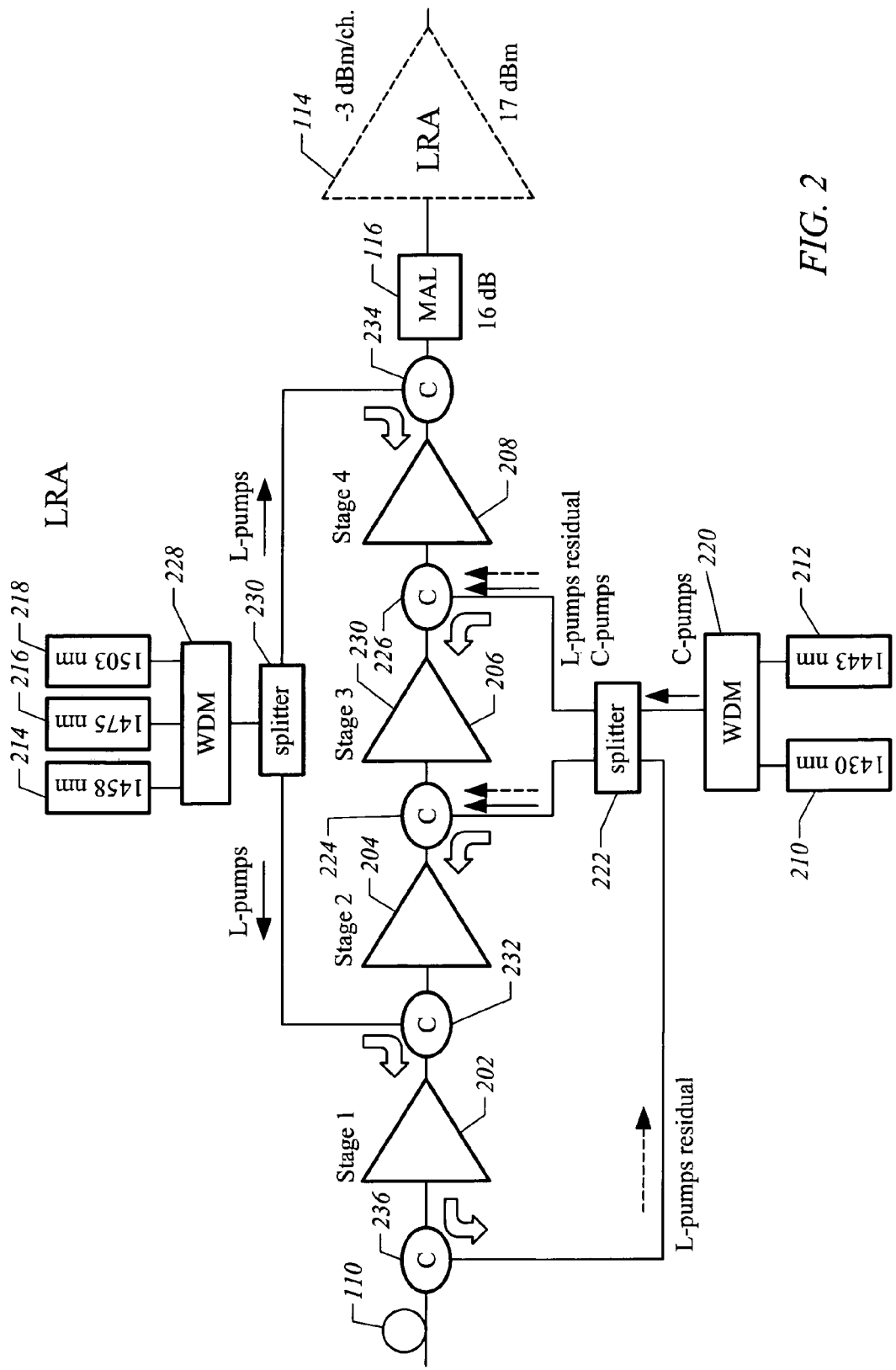
FIG. 2 depicts a lumped Raman amplifier structure according to one embodiment of the present invention.

FIG. 2 depicts a lumped Raman amplifier structure according to one embodiment of the present invention. There are four lumped Raman amplification stages 202, 204, 206, and 208. Stages 202 and 208 mainly amplify channels in the L-band while stages 204 and 206 mainly amplify channels in the C-band. Here L-band may refer to the range between 1570 and 1610 nm, a range that is somewhat larger than that customarily referred to as L-band. The C-band refers to the range between 1530 and 1570 nm. This configuration allows one to avoid pump-to-pump interactions that occur when both bands are amplified together. These interactions would occur due to depletion of the C-band pumps resulting from power transfer from the C-band pumps to the L-band pumps.

To induce Raman amplification in the C-band, two laser pumps 210 and 212 are provided that output pump energy at 1430 nm and 1443 nm respectively. There are three pumps 214, 216, and 218 to induce Raman amplification of the L-band wavelengths. These three pumps operate at 1458 nm, 1475 nm, and 1503 nm, respectively. The various pumps can consist of two standard Fabry-Perot lasers for each wavelength that are polarization multiplexed together and may include gratings for wavelength stabilization as known in the art. Alternatively, a single Fabry-Perot laser with a depolarizer, e.g., a Lyot type depolarizer may be used. For optimal power consumption, newly developed high power hybrid pumps that provide two polarization multiplexed chip lasers in the same substrate may also be used.

The C-band pumps are combined by a wavelength division multiplexer 220 and input to a 2×2 splitter 222. From splitter 222, the C-band pump light is counter-propagated into lumped Raman amplification stages 204 and 206 via 3-port circulators 224 and 226, respectively. The L-band pump light is combined in a wavelength division multiplexer 228. A 1×2 splitter 230 then divides the L-band pump light between lumped Raman amplification stages 202 and 208. The L-band pump light is injected into the lumped Raman amplification stages in a counter-propagating direction via three-port circulators 232 and 234.

Although stages 204 and 206 act primarily as C-band amplifiers they also provide a certain amount of L-band amplification. This is accomplished by transferring residual counter-propagating L-band pump light from the signal input of stage 202 out through a 3-port circulator 236 and then back into stages 204 and 206 via splitter 222 and circulators 224 and 226. The L-band pump reuse in stages 204 and 206 results in relatively little pump-to-pump interaction because of the low power of the L-band pumps relative to the C-band pumps.

By providing some L-band amplification in stages 204 and 206 these stages may then become transparent to the L-band wavelengths. One can then readily provide the capability of modular addition of bands. During a first phase of implementation, only the L-band wavelengths (or a portion thereof) may be included in the WDM link. The C-band pumps 210 and 212 may be omitted during this phase. Since stages 204 and 206 are transparent to the L-band signal, these wavelengths are unaffected by the as yet unimplemented C-band capability. Then when system needs justify the addition of the C-band wavelengths (or a portion thereof) these may be added by inserting the C-band pumps 210 and 212.

The fiber used in the lumped Raman amplifier stages is preferably a Highly Non-Linear Fiber (HNLF) with a small effective area, high Raman gain coefficient, and low pump loss to optimize efficiency. Some representative parameters for this fiber are given in the following Table 1:

| Parameter | HNLF (typical value) |
| --- | --- |
| Effective area ($\mu m^2$) | 9 |
| Loss @ 1550 nm (dB/Km) | 0.49 |
| Loss @ 1455 nm (dB/Km) | 0.69 |
| Loss @ 1485 nm (dB/Km) | 0.58 |
| Raman gain coefficient (m/W) | $6 \times 10^{-14}$ |
| Chromatic Dispersion (ps/nm/Km) | range: 0 to −100 |
| Backscattering coefficient (l/m) | $7.5 \times 10^{-7}$ |

TABLE 2

| Pump wavelength (nm) | Pump power in fiber (mW) | | | |
| --- | --- | --- | --- | --- |
| | Stage 1 (2 Km) | Stage 2 (1.1 Km) | Stage 3 (1.1 Km) | Stage 4 (2 Km) |
| 1430 | — | 225 | 225 | — |
| 1443 | — | 155 | 155 | — |
| 1458 | 100 | 11 (residual) | 11 (residual) | 100 |
| 1475 | 124 | 23 (residual) | 23 (residual) | 124 |
| 1503 | 125 | 52 (residual) | 52 (residual) | 125 |
| Total pump (mW) | 349 | 380 | 380 | 349 |

In one particular implementation, there are five spans of 20 dB, each lumped Raman amplifier 114 has a gain of 18 dB, and 16 dB of loss is allocated for MAL 116. For this example, Table 2 gives pump power values and fiber lengths for each of the stages.

Chromatic dispersion compensation may be provided by every amplifier stage or by only a subset of the stages. In general, all these stages can be made pluggable so that one can use Raman fiber having the correct amount of chromatic dispersion compensation needed at that point in the link. For example, each of the dispersion compensating stages could have one of four fiber dispersion values between 0 and −100 ps/nm/Km. The chromatic dispersion slope of the HNLF used in the lumped Raman amplification stages can be tailored to match that of the single mode fiber used in the spans. Also, if needed, a dispersion slope compensator may be used.

Figure 4:
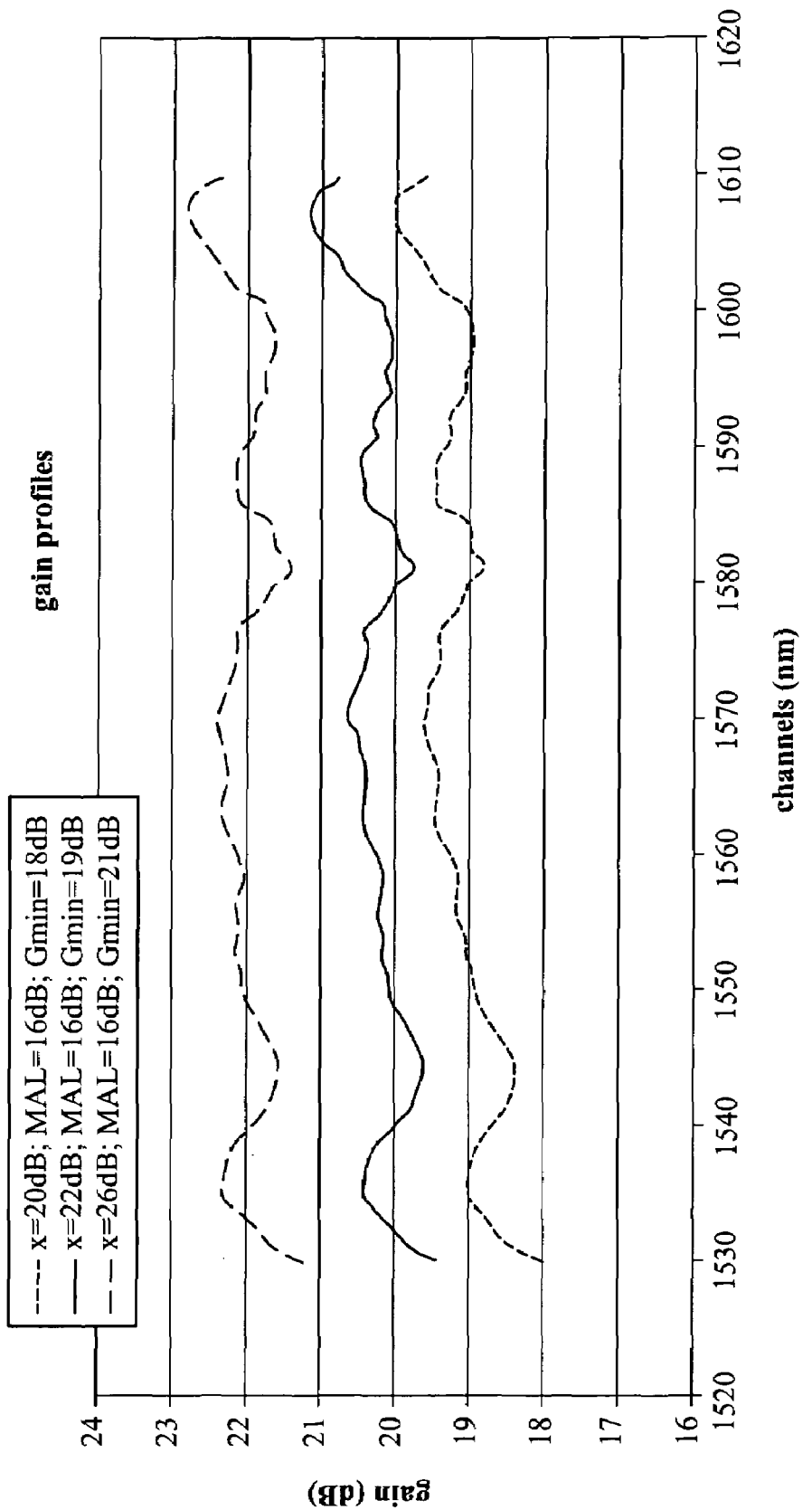
FIG. 4 depicts gain over wavelength for the lumped Raman amplifier structure of FIG. 2 according to one embodiment of the present invention.
Figure 5:
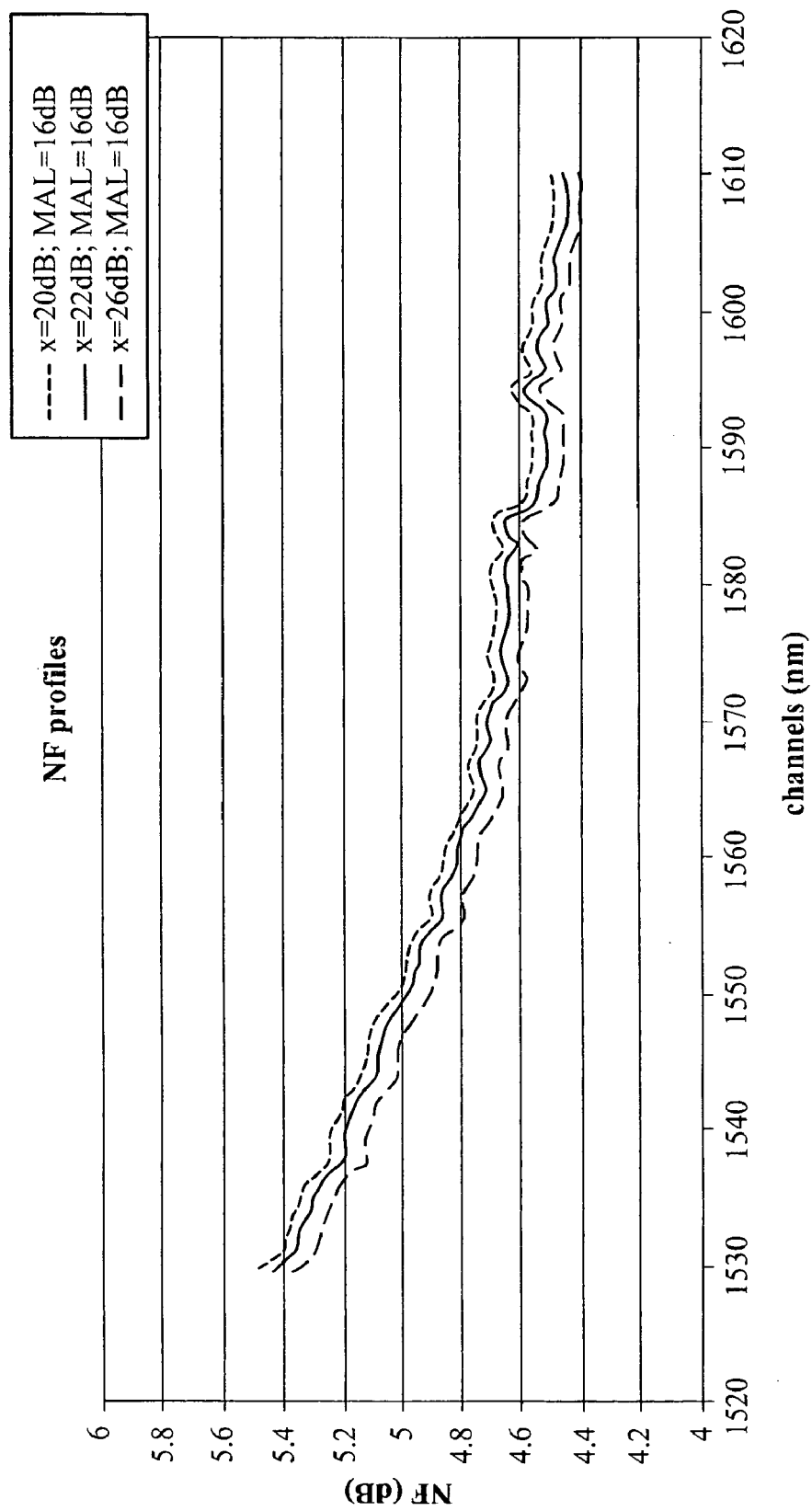
FIG. 5 depicts noise figure over wavelength for the lumped Raman amplifier structure of FIG. 2 according to one embodiment of the present invention.
Figure 6:
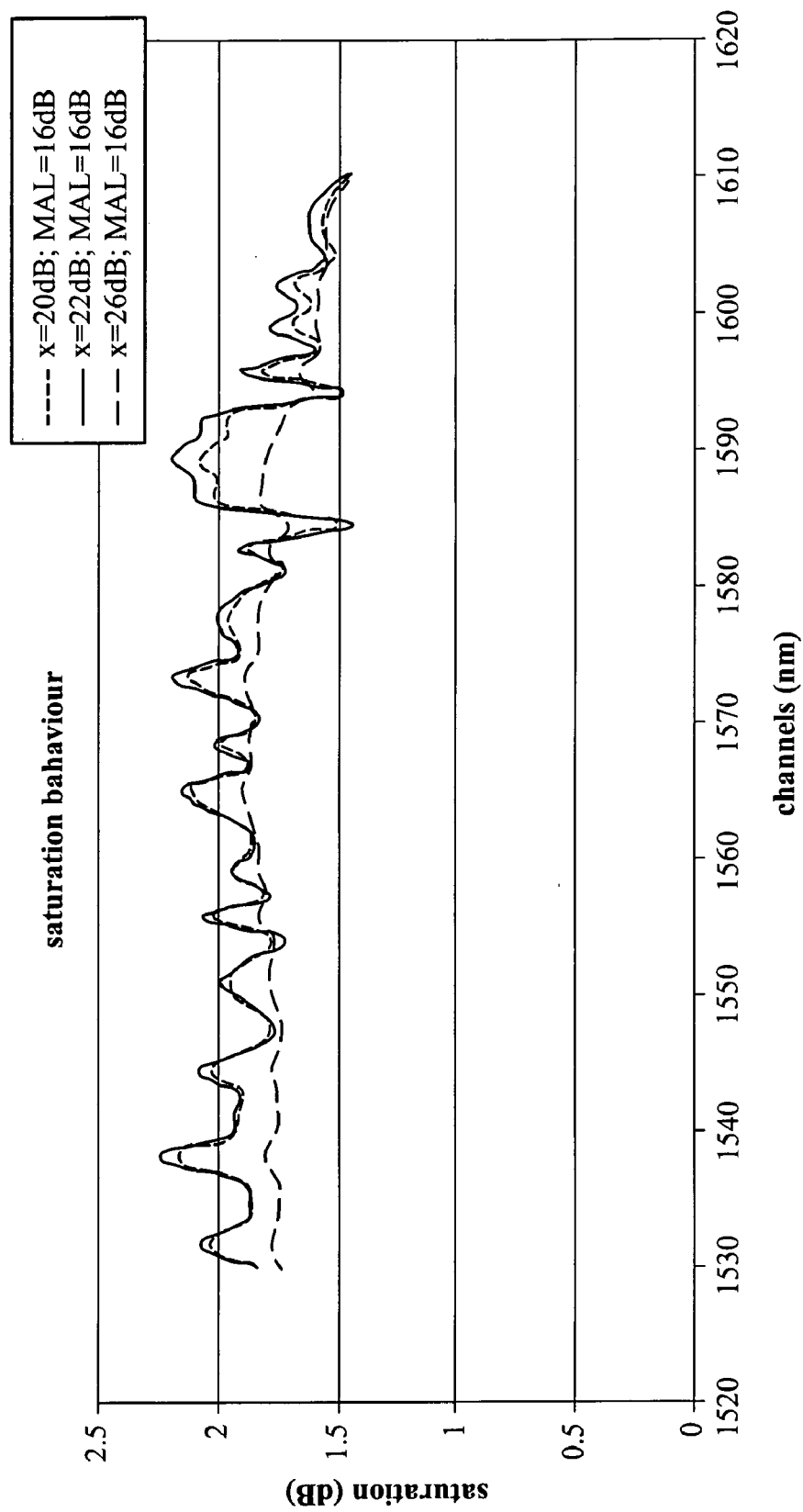
FIG. 6 depicts saturation over wavelength for the lumped Raman amplifier structure of FIG. 2 according to one embodiment of the present invention.

FIG. 4 depicts the spectral gain profile of lumped Raman amplifier module 114 of FIG. 2, as it would be configured for three different span budgets, 20 dB loss, 22 dB loss, and 26 dB loss. FIG. 5 depicts noise figure profiles across spectrum for lumped Raman amplifier module 114 of FIG. 2. FIG. 6 depicts the saturation behavior across spectrum for lumped Raman amplifier module 114 of FIG. 2.

Figure 3:
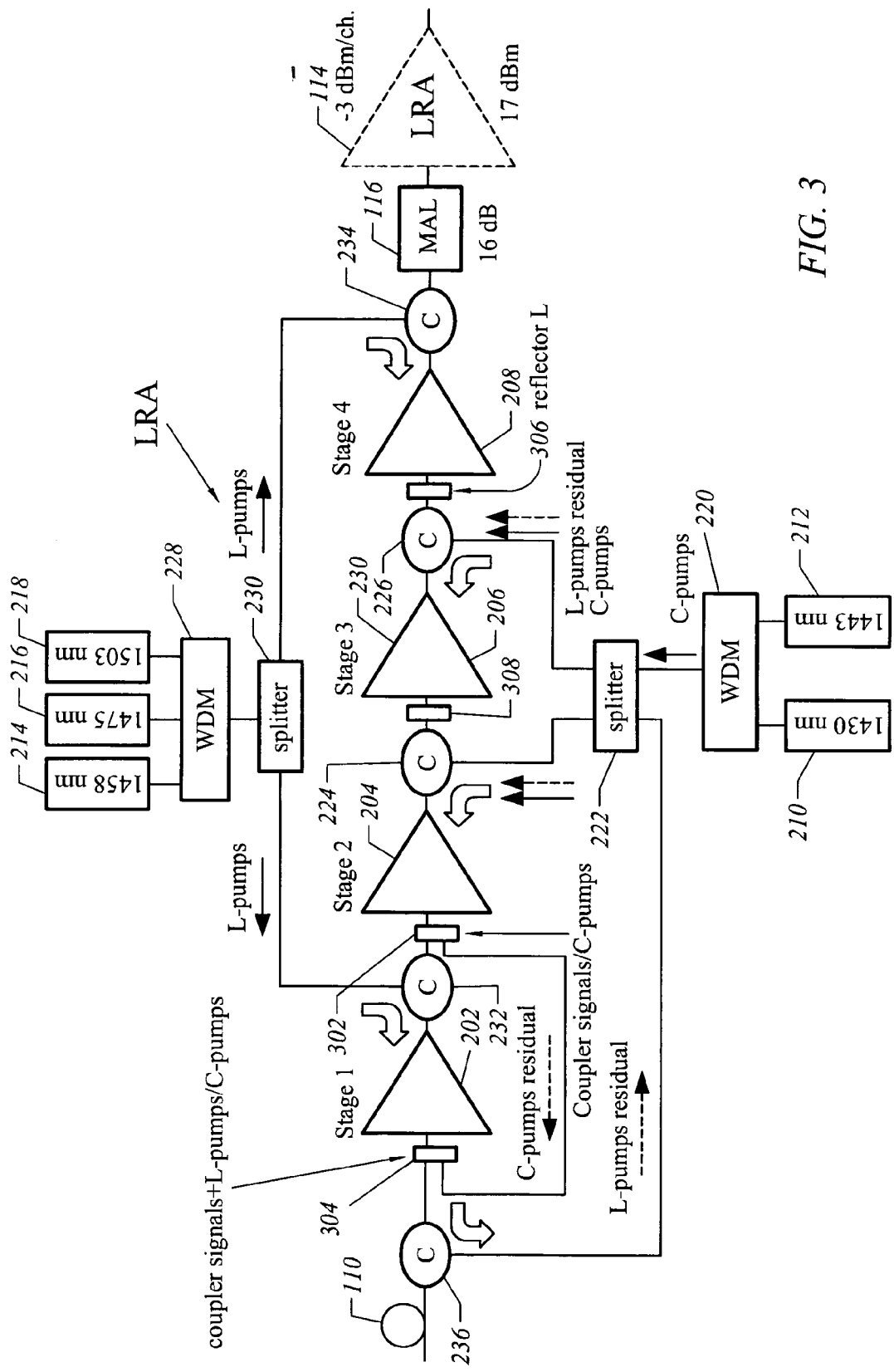
FIG. 3 depicts an alternative lumped Raman amplifier structure according to one embodiment of the present invention.

In lumped Raman amplifier module 114 as depicted in FIG. 2, C-band noise figure is impacted by the lack of any C-band amplification in the first stage 202. FIG. 3 depicts an alternative implementation of lumped Raman amplifier module 114 according to one embodiment of the present invention. The structure depicted in FIG. 3 provides improved C-band noise figure and improved overall amplifier efficiency. A pair of couplers 302 and 304 directs residual C-band pump light into stage 202 in a co-propagating direction relative to the optical signal. Couplers 302 and 304 also direct second-order residual L-band pump light into stage 202. The addition of C-band gain in stage 202 improves the C-band noise figure.

Further improvement in efficiency can be provided by inserting an L-band pump reflector 306 between circulator 226 and stage 208. Also, a C+L-band pump reflector 308 may be placed between circulator 224 and stage 206. This preserves a greater amount of L-band pump light within stage 208 and a greater amount of both kinds of pump light within stage 206. The structure of FIG. 3 brings the C-band noise figure down to 4.5 dB. Also, overall efficiency is improved.

Many variations on the embodiments described above may be implemented. For example, parameters of the HNLF including effective area, length, and fiber loss may be varied. The wavelengths and powers of the pumps may be varied. Also, for example, an additional C-band pump wavelength may be added to increase bandwidth to 100 nm or more. Further increases in bandwidth may be accomplished by adding further pump wavelengths for C-band or L-band.

The band amplification sequence in FIGS. 2–3 may be changed while achieving the same performance. For example, if a capital letter represents the principal band of amplification and a lower case letter refers to amplification due to residual pump power, other possible configurations include, e.g., C+1/L/C+1/L or C+1/L/L/C+1. Also the amplification bands themselves may be shifted by varying the pump wavelengths. One can also use a smaller (as few as two) or larger number of stages. One can also add co-propagating pump power where desired.

Many advantages are provided by the above-described lumped Raman amplification structure. For example, consider a situation where there are seven spans of 14 dB loss each and the power per channel launched in the transmission fiber is −3 dBm/ch for a total power of 17 dBm (i.e., 100 channels, each modulated with 10 Gbps). The gain for each amplifier module should be at least 15 dB (assuming 16 dB access loss for an OADM is included between the two amplifier modules). For an EDFA-based system that employs only 32 channels, the same span reach would require a launch power of +2 dBm/ch due to the higher equivalent noise figure of the EDFA system. Due to the higher launch power, the EDFA system exhibits reduced linearity. Consequences of reduced linearity include a need for greater precision in chromatic dispersion compensation at the expense of deployment flexibility and also greater difficulty in upgrading to 50 GHz spacing due to four-wave mixing (FWM) effects.

Lumped Raman amplifier module 114 also has relatively low amplifier saturation. This makes gain control easier to implement and facilitates a highly variable number of channels.

There is also low noise figure without the use of a co-propagating pump. Optimal power efficiency is provided. Even without the use of pump reflectors there is a similar pump power per channel efficiency as would be found in an equivalent EDFA.

If needed, gain flatness can be improved using known flattening filter technologies, for example, fiber long period gratings This type of filter can be placed in any position depending on system architecture optimization.

The lumped Raman amplification structure is robust to non-linear effects such as four wave mixing (FWM) and interference noise. Double Rayleigh Scattering (DRS) noise for both lumped Raman amplifier modules is approximately 42 dB below the signal and there is negligible four-wave mixing cross talk.

The lumped Raman amplification structure that has just been described also has highly beneficial modularity properties. As has been discussed, C-band pumps may be added only when those channels are actually needed to carry revenue bearing services. Also, the Raman fibers used for the various stages may be made modular so that one can vary the amount of chromatic dispersion as desired while preserving the same gain.

Furthermore, the structure provides cost advantages. This is due to the relatively high power efficiency, the use of embedded dispersion compensation, and the overall modularity.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for amplifying an optical signal, the method comprising:
   providing an input signal having first and second non-overlapping bands of active wavelengths;
   amplifying said input signal in a first stage having substantially greater gain in said first band than in said second band;
   amplifying said input signal in a second stage following said first stage, said second stage having substantially greater gain in said second band than in said first band;
   amplifying said input signal in a third stage following said second stage, said third stage having substantially greater gain in said first band than in said second band;
   amplifying said input signal in a fourth stage between said second stage and said third stage, said third stage having substantially greater gain in said second band than in said first band;
   directing pump light into said first stage and said third stage at wavelengths selected to induce Raman amplification of said first band including counter-propagating said pump light into said first stage and said third stage relative to propagation of said optical signal;
   directing pump light into said second stage and said fourth stage at wavelengths selected to induce Raman amplification of said second band including counter-propagating said pump light into said second stage and said fourth stage relative to propagation of said optical signal; and
   directing residual pump light at said wavelengths selected to induce Raman amplification of said second hand into said first stage, wherein limited Raman amplification of said second band is induced in said first stage.

2. The method of claim 1 further comprising:
   directing residual pump light at said wavelengths selected to induce Raman amplification of said first band into said second stage and said fourth stage.

3. An apparatus for amplifying an optical signal, the apparatus comprising:
   an input that receives the optical signal having first and second non-overlapping bands of active wavelengths;
   a first Raman amplification stage that amplifies said optical signal and has substantially greater gain in said first band than in said second band;
   a second Raman amplification stage that amplifies said optical signal and has substantially greater gain in said second band than in said first band;
   a third Raman amplification stage that amplifies said optical signal and has substantially greater gain in said first band than in said second band;
   a fourth Raman amplification stage between said second amplification stage and said third amplification stage, said fourth amplification stage having substantially greater gain in said second band than in said first band; and
   a first pump light source that generates first pump light for injection into said first stage and said third stage at wavelengths selected to induce Raman amplification of said first band.

4. The apparatus of claim 3 further comprising:
   a first circulator that injects said first pump light into said first stage in a counter-propagating direction relative to said optical signal.

5. The apparatus of claim 4 further comprising:
   a second circulator that injects said first pump light into said third stage in a counter-propagating direction relative to said optical signal.

6. The apparatus of claim 5 further comprising:
   a second pump light source that generates second pump light for injection into said second stage and said fourth stage at wavelengths selected to induce Raman amplification of said second band.

7. The apparatus of claim 6 further comprising:
   a third circulator that injects said second pump light into said second stage in a counter-propagating direction relative to said optical signal.

8. The apparatus of claim 7 further comprising:
   a fourth circulator that injects said second pump light into said fourth stage in a counter-propagating direction relative to said optical signal.

9. The apparatus of claim 8 further comprising:
   a coupler that directs a residual portion of said second pump light from said second stage into said first stage in a co-propagating direction relative to said optical signal.

* * * * *